Jan. 12, 1943.  J. MIHALYI  2,308,017
RELEASE DEVICE FOR PHOTOGRAPHIC SHUTTERS
Filed Sept. 13, 1941
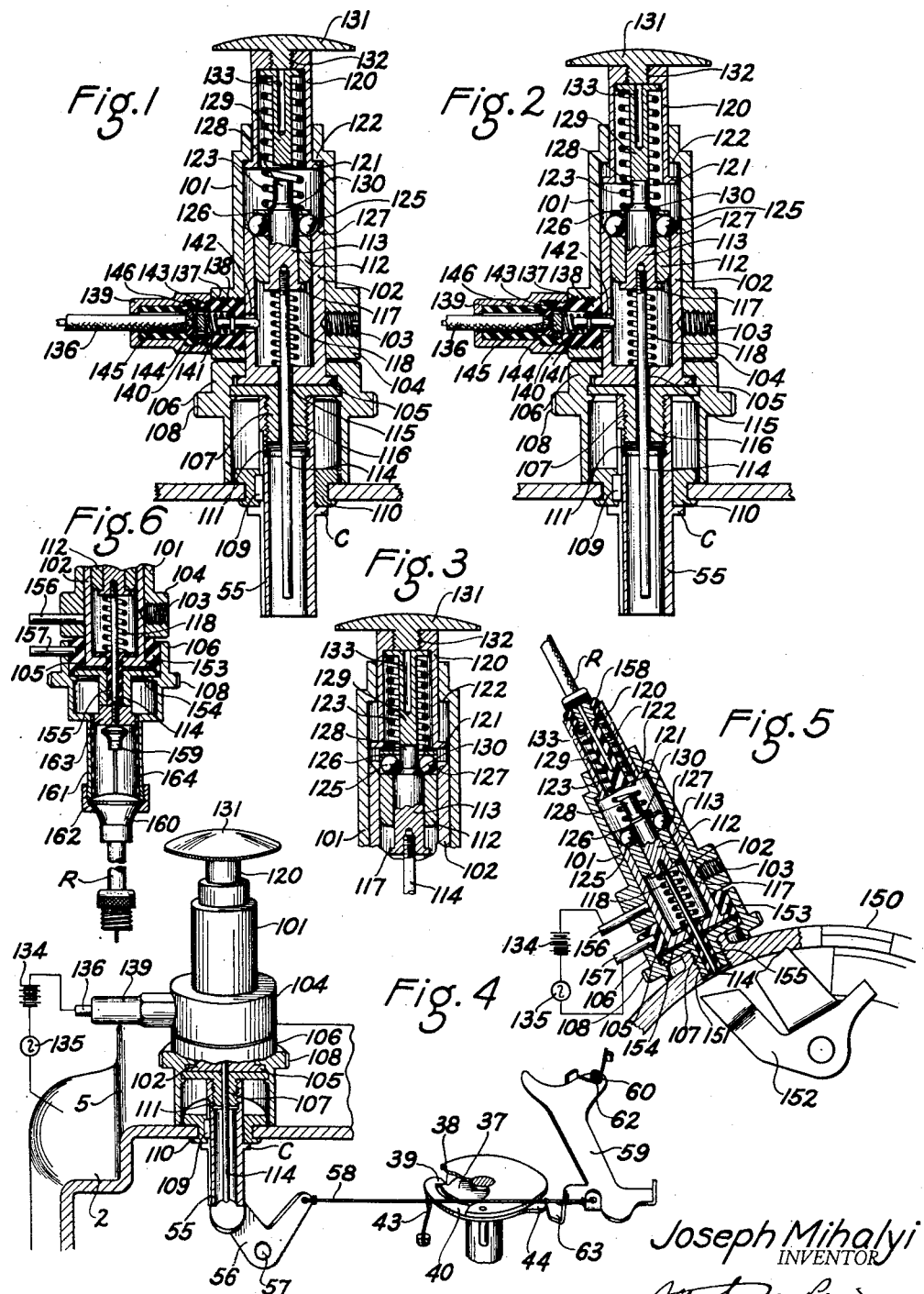
Joseph Mihalyi
INVENTOR
BY
ATTORNEYS Patented Jan. 12, 1943

2,308,017

UNITED STATES PATENT OFFICE 2,308,017

RELEASE DEVICE FOR PHOTOGRAPHIC SHUTTERS

Joseph Mihalyi, Rochester, N. Y., assignor to Eastman Kodak Company, Rochester, N. Y., a corporation of New Jersey Application September 13, 1941, Serial No. 410,750

11 Claims. (Cl. 67—29)

The present invention relates to a shutter release device for releasing the shutter of a photographic camera, and particularly to a shutter release device which is separate from the camera and capable of detachable connection thereto in operative relation with the shutter release of the camera.

Shutter releases of the type mentioned have been available but have possessed inherent disadvantages which rendered them unsatisfactory. A device of this kind necessarily includes a plunger mechanism of some sort which is normally retracted and is manually depressed by a finger-operated member against the action of the retracting spring to engage and actuate the shutter release member. It is generally desirable in operating a shutter release to push the same completely through its full stroke to a release position rather than to "inch" it along to a release position as some amateurs unconsciously tend to do. This "inching" along of the release is particularly undesirable where the shutter release device is used as a flash synchronizer to close the lamp circuit in timed relation to the tripping of the shutter, because it permits the operator to move the release member far enough to close the lamp circuit and then stop without continuing the motion to trip the shutter. The operator may not necessarily stop the release device after closing the lamp circuit but may momentarily hesitate at this point and thus spoil synchronization which ordinarily depends upon the proper speed of movement of the shutter release device throughout its full stroke of movement.

Frictional restraining means have been applied to the plunger mechanism of shutter release devices of this type with the idea of compelling the operator to build up sufficient pressure on the release member thereof to initially put it into motion to insure the plunger moving through its complete stroke once starting to move despite the tendency of the operator to "inch" it along. While this frictional restraining means served its ultimate purpose it was found that the manual pressure required on the release member to overcome said restraining means, when the latter was released, was transmitted to the shutter mechanism with an impact which not only caused undesirable camera movement but in some instances was sufficient to damage the shutter mechanism.

Therefore, one object of the present invention is to provide a shutter release device which can be detachably connected in operative association with the release member of a camera shutter, and provides for an actuation of the plunger assembly, which operates said release member, which is uniform in pressure and definite as to the length of its operating stroke.

Another object is the provision of a device of the type set forth in which the plunger assembly is moved by a spring and is not operated by direct manual pressure.

A further object is to provide a device of this type in which the plunger mechanism is releasably locked against movement until a given tension is built up in the driving spring therefor so that the mechanism moves with a given force each time it is actuated.

Another object is to provide a device of the type set forth in which the latch member for the plunger assembly serves as a connecting member between the relatively movable parts of said mechanism when not serving in its latching capacity.

And yet another object is to provide a device of the type set forth with a novel releasable locking means which is a part of, and is actuated by part of, the plunger mechanism.

And still another object is to provide such a device which can be readily connected into a flash lamp circuit and insure proper synchronization of a flash lamp with the tripping of a shutter.

And another object is to provide a device of the type set forth which is simple in construction, efficient in operation, as well as neat in appearance, and capable of use with cameras of any type.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawing in which:

Fig. 1 is an enlarged sectional view of a shutter release device constructed in accordance with one embodiment of the present invention mounted on a camera having a focal plane shutter, and showing the plunger mechanism thereof locked in a full retracted position, Fig. 2 is a view corresponding to Fig. 1, and showing the manually actuated member of the device moved to the point where it just engages the top of the plunger after placing the driving spring under a given compression, Fig. 3 is a partial section corresponding to Figs. 1 and 2, and showing the manually actuated member of the device depressed to a point where it releases the locking means for the plunger mechanism and places the driving spring under full compression, Fig. 4 is a fragmentary perspective view, partly in section, showing the cooperation of the device shown in Figs. 1-3 with the shutter release mechanism of a camera and the manner of connecting it into a flash lamp circuit, Fig. 5 is a sectional view of another embodiment of the shutter release device mounted on a between-the-lens type of shutter, and showing how it is connected into a flash lamp circuit, Fig. 6 is a partial sectional view showing the device modified to be detachably connected to the end of a conventional cable release, Like reference characters refer to corresponding parts throughout the drawing.

Generally, the present device comprises a housing which is adapted to be detachably connected to a camera adjacent the shutter release member so that a plunger assembly slidably mounted therein will engage and operate the shutter release when moved from a normally retracted position. Instead of the plunger assembly being moved by direct manual pressure thereon, as is the usual practice in devices of this type, it is moved by a driving spring which is placed under compression by a manually operated actuating member, the plunger assembly being locked in a retracted position until the spring is placed under a given compression after which it is released by said manually operated actuating member. The device is adapted to be electrically connected into a flash lamp circuit so that it serves to ignite a flash lamp and trip the shutter in proper timed relation for taking flash pictures.

The shutter release device constituting the present invention may be adapted for use with any camera having a reciprocal shutter release member movable to an inoperative position. However, for the purpose of illustrating one embodiment of the invention, I have chosen to show it in combination with a camera having a shutter and shutter release of the type disclosed in my U. S. Patent 2,203,657, issued June 6, 1940.

Referring to Figs. 1, 2, and 3, the camera may comprise a metal camera body, indicated generally by the numeral 1, on the top wall 2 of which is formed a metal housing, or super structure 5, within which most of the shutter control parts are arranged. Extending through, and slidably mounted relative to, the top of the housing 5 is a shutter operating member 55 the lower end of which normally contacts a bellcrank 56 pivoted at 57. The operating member 55 may be provided with a flange C to prevent the member from sliding out of the camera body and to limit the outward movement thereof. One arm of the bellcrank is connected by a rigid link 58 to a horizontally movable lever 59 pivoted at 60 in the housing 5. The lever 59 is normally moved counterclockwise by the spring 62 so that the shutter operating member 55 is normally moved to an extended position relative to the top of the housing 5. For the purpose of pointing out how a depression of the shutter operating member 55 releases the shutter, it will suffice to say that the shutter is normally held in a tensioned condition when the nose 39 on the pawl 40 engages the shoulder 38 on the collar 37, this pawl being normally spring-pressed to the position shown in Fig. 4 by a spring 43. The pawl is pivoted to release the nose 39 from engagement with the shoulder 38 when the lever 59 is pivoted clockwise by a depression of the shutter operating member 55, the turned down lug 63 on the lever 59 engaging the small end 44 on the pawl 40 to effect such a movement of the same. So far as the present invention is concerned, only the described operation of the shutter operating member and bellcrank 56, which may be considered the shutter release member, is essential to an understanding of the same, but if a full description of the shutter itself is desired for any reason, the same can be had by referring to my above noted patent wherein said shutter is fully disclosed. The shutter operating member 55 is tubular in form, and threaded at its upper end 100 for the reception of a cable release in which case the cable of the cable release will pass through said member to directly contact the bellcrank to release the shutter. When no cable release is used, the shutter is tripped by pressing downwardly upon the operating member 55 directly and sliding the same relative to the camera body.

Coming now to the present invention, in Figs. 1-4 I have shown an embodiment of the shutter release device particularly adapted for tripping a shutter of the type set forth. This device may comprise the plunger housing 101 into the lower end of which extends a tubular plunger insert 102 and which insert is held in a desired position in the housing by a setscrew 103 passing through the flange 104 on said housing. Rotatably supported on a flange 105 on the lower end of said insert 102 is a skirt member 106 in which is non-rotatably mounted an attaching nut 107 adapted to be threaded into the threaded end 100 of the shutter operating member 55 to attach the shutter release device to the camera. The attaching nut 107 can be readily screwed into the end of the operating member by gripping the knurled flange 108 on the skirt member and turning said skirt member relative to the plunger housing. It will be readily appreciated that the shutter operating member 55 should be held against rotation to permit the attaching nut 107 to be readily screwed thereinto, and this may be done in any suitable way, as for instance, providing a key 109 on the bush 110, fixed to the wall of the housing, and through which the member slides, engaging a key slot 111 extending longitudinally of the shutter operating member.

The skirt member is of such a length that the lower end thereof engages the top of the housing 5 when the attaching nut 107 is fully screwed into the end of the shutter operating member 55 and prevents the depression of said operating member when pressure is applied downwardly of the shutter release device, as will be hereinafter fully set forth. In other words, the skirt member prevents the shutter operating member 55 from being depressed in the normal manner to engage the bellcrank 56 and trip the shutter. The skirt may be of such a length that when the attaching nut 107 is screwed into the end of the operating member 55 said member will be slightly withdrawn from normal engagement with the bellcrank 56 until the flange C thereon engages the under side of the bush 110, or it may be of such length as to allow the member 55 to remain in normal inoperative position where it engages the top of the bellcrank.

Slidably mounted within the plunger housing is a plunger assembly for operating the bellcrank 56 to trip the shutter. This plunger assembly comprises a sleeve 112 slidably engaging the plunger insert 102 and within which is slidably mounted a plunger 113. Into the lower end of the plunger 113 is threaded a plunger extension rod 114 which passes through bores 115 and 116 in the bottom of the insert 102 and through the attaching nut 107, respectively, and this rod is adapted to extend through the operating member 55 when the shutter release device is attached to the camera. It will be readily appreciated that the plunger 113 and the extension rod 114 attached thereto could be made from one piece if desired, but it is preferably made in two pieces, as shown, for the purpose of ease in manufacture and adjustment. The plunger includes a flange 117 which overhangs the lower end of the sleeve 112 and by virtue of which upward movement of the plunger relative to the sleeve is limited as will be apparent from the following description.

A coiled compression spring 118 surrounding the extension rod 114 and located between the bottom of the insert 102 and the bottom of the flange 117 on the plunger 113 normally moves the plunger assembly to a retracted position, see Figs. 1 and 2, in which position the end of the extension rod forming a part thereof is spaced from the arm of the bellcrank in the camera. Slidably extending through the open upper end of the plunger housing 101 is a recessed actuating member 120 the lower end of which is flanged, as shown at 121, to engage an inwardly extending shoulder 122 on the upper end of the housing to limit the outward movement of said member relative to the housing. The coiled compression spring 123 located between the top of the sleeve 112 and the bottom of the recess in said actuating member 120 provides a yieldable coupling between the actuating member and the plunger assembly so that the latter is adapted to be moved to its extended position to engage the bellcrank 56 and trip the shutter by spring action rather than by positive engagement between the actuating member and the plunger assembly. The compression spring 123 in its fully expanded condition, or when the actuating member 120 is moved thereby to its uppermost position, see Fig. 1, is weaker than the retracting spring 118 so that the plunger assembly is normally moved to its retracted position, see Fig. 1, and in which position the end of the extension rod 114 is raised from engagement with the bellcrank 56.

The plunger assembly is adapted to be releasably locked in its retracted position so that a manual depression of the actuating member can effect a given compression of the driving spring 123 after which the plunger assembly is adapted to be released so that the power of the spring can move it downwardly to trip the shutter. The releasable locking means for the plunger assembly comprises one or more balls 125 loosely mounted in apertures 126 extending through the wall of the sleeve 112 near its upper end to move laterally of said sleeve. The balls 125 are slightly larger in diameter than the width of the wall of the sleeve 112 so that a portion of the periphery thereof is adapted to extend beyond the two faces of the wall of said sleeve when the balls are centrally located in the apertures relative to the thickness of the wall.

When the plunger assembly is moved to its retracted position by the spring 118 that portion of the plunger 113 closely fitting the inside of the sleeve 112 is adapted to engage and move the balls laterally of the sleeve and into engagement with a downwardly tapered end 127 of the insert 102. When the balls are in this position, see Figs. 1 and 2, they engage both the movable sleeve and the stationary insert and thereby serve to lock the sleeve against downward movement. The plunger when in its retracted position serves to hold the balls in a locking position relative to the sleeve and tapered end of the insert, and during this time a depression of the actuating member 120 will serve to compress the driving spring 123 since this spring rests on the top of the sleeve which is locked against movement.

The upper end 128 of the plunger 113 is of smaller diameter than the major portion of the plunger, and is of such a size that when it is opposite the apertures 126 in the sleeve it permits the balls 125 to move laterally inwardly of the sleeve and from engagement with the tapered end of the insert to release the sleeve and plunger assembly, see Fig. 3. Slidably mounted within the recess of the actuating member is a downwardly projecting pin 129 which is normally held against the end of the actuating member by the driving spring 123 and which is adapted to engage and depress the plunger relative to the sleeve, when depressed to compress the driving spring 123, to bring the reduced end thereof opposite the apertures in the sleeve so that the balls may move inwardly of the sleeve to disengage the tapered end of the insert and thereby release the plunger assembly. Looking at Fig. 1, it will be noticed that when the plunger assembly and actuating member are each in their full retracted positions that the end of the pin 129 within the actuating member is spaced from the upper end of the plunger. This arrangement of parts is provided so that the actuating member upon being depressed will place the driving spring under a given compression before the pin 129 engages the end of the plunger and serves to depress the same upon further movement to a point where the balls 125 are released from the tapered end of the insert. In Fig. 2 the actuating member is shown in the position it assumes after being depressed just far enough for the pin 129 to engage the top of the plunger without moving the same to release the locked plunger assembly.

After the actuating member 120, and the pin 129 movable therewith, has been depressed to the position shown in Fig. 2, further depression thereof will cause the plunger to be slid relative to the sleeve until the reduced portion thereof is opposite the apertures 126 in said sleeve whereupon the balls will move inwardly of the sleeve to disengage the tapered end of the insert and release the plunger assembly so that the driving spring 123 is free to expand and move the sleeve and plunger to a shutter tripping position, see Fig. 3. When the driving spring 123 is placed under compression it exerts a downward force on the sleeve 112 which is transmitted to the balls carried thereby, and since these balls engage a tapered surface, the instant they have a place to move to, provided by the reduced end of the plunger, they will automatically roll inwardly of the sleeve and from engagement with the tapered end of the insert. After the plunger assembly is released from its locked condition, the driving spring in expanding moves the plunger assembly to an extended position independently of the actuating member so that the shutter tripping action is uniform each time and is incapable of manual control whereby the disadvantage of camera jar, and an "inching" operation inherent in most devices of this type, is overcome.

As will be clearly apparent from an inspection of Figs. 1, 2, and 4, parts of the shutter release device are so constructed that the end of the extension rod 114 is spaced from the bellcrank 56 when the plunger assembly and actuating member are in a fully extended position. This spacing is slightly greater than the movement of the plunger relative to the sleeve by the actuating member necessary to release the locking means for the sleeve so that the movement of the plunger and extension rod by the actuating member to release the sleeve will not end to move said bellcrank, but the tripping action will be completely accomplished by the driving spring entirely independently of direct manual pressure on the plunger assembly.

Referring to Fig. 3, when the balls are forced inwardly of the sleeve 112 from engagement with the tapered end 127 of the insert they move into engagement with a tapered shoulder 130 connecting the large and reduced diameters of the plunger and are held in engagement therewith due to the fact that the balls are confined in this position by the inner wall of the insert at all times when the sleeve is not in its fully retracted position. By virtue of this arrangement the sleeve and plunger are connected together by the balls since downward movement of the sleeve under the action of the driving spring 123 is transmitted to the plunger by the balls and upward movement of the plunger by the retracting spring 118 is transmitted to the sleeve through the balls. As will be apparent from an inspection of Fig. 3, the retracting spring 118 acts to move the plunger assembly to its retracted position when the actuating member is released to let the driving spring 123 expand to its normal condition, and will move the plunger and sleeve upwardly together until the sleeve reaches its fully retracted position whereupon the balls will be forced outwardly of the sleeve by the tapered shoulder 130 on the plunger and into engagement with the tapered end 127 of the insert 102 again, the plunger continuing to move upwardly relative to the sleeve under the action of the spring 118 until the flange 117 thereon engages the lower end of the sleeve. At this time the parts are again in the relative position shown in Fig. 1 and the device is ready for a repeat operation.

The upper end of the actuating member 120 may be provided with a finger-piece 131 which the operator may directly press with his finger. However, in the event it is desired to operate this device by means of a well-known type of cable release, the upper end of the actuating member may be provided with a threaded socket 132 into which a finger-piece or the end of a cable release may be interchangeably threaded, see Fig. 5. To adapt this device for use with a cable release the movable pin 129 within the actuating member is provided with a bore 133 into which the end of the cable of the cable release may extend when attached to the device to give a desirable operative connection, see Fig. 5.

The shutter release device may be readily adapted to the synchronization of the flashing of a flash lamp with the tripping of the camera shutter as will now be set forth. A camera of this type is adapted to use a flashlight unit of the type set forth in my copending application, serial No. 325,171, filed March 21, 1940. As will be apparent from an inspection of this noted copending application the flash unit constitutes an electric circuit including a source of potential in a flash lamp circuit, one side of said circuit being grounded to the metal camera body when the unit is mounted on the camera, the other side of the circuit constituting a lead wire which may be attached to the shutter release member to close the circuit in proper timed relation to a tripping of the camera shutter.

Inasmuch as the flashlight unit is fully disclosed in my noted copending application, and forms no part of the present invention, it need not be shown herein. For the purpose of the present invention it will suffice to say that a flashlamp circuit including a source of potential 134 and a flash lamp 135 has one side grounded to the metal camera body and the other side connected to a lead wire 136 which may be detachably connected to the present shutter release device. Since the camera body and all parts of the shutter operating mechanism are metal and are in electrical contact, the bellcrank 56 of a shutter will constitute one switch contact of the lamp circuit when the same is grounded to the camera body.

Referring now to Fig. 2, the flange 104 of the plunger housing 102 may be provided with a threaded socket 137 into which a plug 138 of insulating material may be threaded. An attaching cap 139 on the end of the lead wire 136 may screw onto a threaded end of the plug 138 extending from the socket 137. Slidably mounted in a recess 140 in the plug 138 is a contact 141 the end of which is adapted to extend through a hole 142 in the insert 102 and into the path of the sleeve 112 of the plunger assembly. This contact is normally pressed into the path of the sleeve by a coil spring 143 located between a metal limiting shoulder on the contact and a metal retaining ring 144 screwed into the end of the plug 138. The end 145 of the lead wire is provided with a contacting portion 146 which is adapted to be electrically connected to a metal insert in the retaining ring when the attaching nut 139 is screwed onto the plug 138. Thus, when the sleeve 112 moves downwardly to its extended, or shutter tripping, position it engages the contact 141 and electrically connects the extension rod 114 to one side of the circuit so that the end thereof becomes a switch contact of the circuit adapted to close the circuit the instant the same contacts the bellcrank 56 which is the other switch contact. Since the camera disclosed is provided with a focal plane shutter, a flash lamp suitable for use with such shutters, and having a relatively long flash peak, must be used. This type of lamp has a short "lag," which the time between ignition and reaching the peak of illumination of a lamp is known as, which must be accounted for, so that the parts of the device are preferably arranged whereby the sleeve engages the contact 141 a short interval before the end of the extension rod 114 moves the bellcrank 56 far enough to trip the shutter. In the event that this timing requires the sleeve 112 to pass over the contact the spring mounting of the contact permits such occurrence without affecting the operation of the shutter release device.

In Fig. 5 I have shown a modification of my novel shutter release which is adapted for use with shutters of the between-the-lens type and which can be detachably connected directly to the shutter casing in operative association with the shutter release member within the shutter. Shutters of this type comprise a circular casing 150 the wall of which includes a threaded cable release socket 151 directly below which is situated the end of a bellcrank 152 counter-clockwise movement of which serves to trip the shutter. The shutter release according to the modification shown in Fig. 5 differs from the one previously described only slightly, said differences being in the relative size of certain parts and the insulation of the parts from one another to adapt the device to a two-wire flash synchronizing system, so that only the differences of the two will be specifically pointed out, the same reference characters referring to corresponding parts in the two modifications.

Referring now to Fig. 5, the threaded end of the attaching nut 107 is made so that it can be screwed into the universally threaded cable release socket 151 on all shutters of the type shown. The length of the skirt member 106 is reduced to permit the attaching nut to be threaded into the cable release socket. To adapt this device to the synchronization of a flash lamp and the release of the shutter, a two-wire system is used, or one side of a lamp circuit including a source of potential 134 in a flash lamp 135 is electrically connected to the extension rod 114 of the plunger assembly while the other side of the circuit is grounded to the metal shutter casing and thereby electrically connected to the bellcrank 152 in the shutter which becomes a switch contact of the circuit. Therefore, with this arrangement the instant the end of the extension rod 114 of the plunger assembly touches the bellcrank 152 the lamp circuit is closed to ignite the lamp. Flash lamps having "lags" substantially equal to the "lag" in the shutter mechanism are advised for use with a synchronizer operating on this principle, such lamps being obtainable on the market and sold under the trade name of S. M. Flash Lamps.

In the device shown in Fig. 5 the skirt member 106 instead of being in direct contact with the plunger insert 102 is insulated therefrom by the insulating bushing 153. Furthermore, the attaching nut 107 is insulated from the plunger insert 102 and the plunger extension rod 114 by disk 154 and sleeve 155 both made of insulating material. One electrical jack 156 adapted to be connected to one side of the flash lamp circuit in any suitable manner is fixed to the plunger housing 101, and a second electrical jack 157 adapted to be connected to the other side of the lamp circuit is fixed to the skirt member 106. Inasmuch as the plunger housing is in metal contact with the plunger extension rod 114 this rod constitutes one switch contact of the lamp circuit. Bellcrank 152 in the shutter is made the other switch contact by virtue of the metal to metal contact between the same and the shutter casing which the skirt member 106 engages when the device is attached to the shutter, whereby the instant the extension rod strikes the bellcrank the lamp circuit is completed in proper timed relation to the tripping of the shutter. It will be noticed that when the plunger assembly of the device is in its fully retracted position the end of the plunger extension rod 114 is spaced from the bellcrank 152. This spacing between these two members is such as to prevent said rod from being moved into engagement with the bellcrank during the movement thereof by the actuating member necessary to release the sleeve 112, whereby the expansion of the driving spring 123 is relied upon to complete the lamp circuit and trip the shutter. It will be readily appreciated that the operating characteristics of this device insure the plunger assembly being smoothly moved to its full operating stroke every time at a given speed and without jarring the camera, and makes it impossible for an operator to "inch" the plunger assembly through its stroke and to accidentally flash the lamp without tripping the shutter, or change the predetermined timed relation of the two operations necessary to proper synchronization.

The actuating member 120 of the form of the release shown in Fig. 5 may be operated manually by pressing directly on the top thereof as set forth above in connection with the first described embodiment of the device. For the purpose of illustration, however, I have shown a well-known type of cable release R screwed into the top of the actuating member for operating the plunger assembly. The cable release is screwed directly into the actuating member and would be electrically connected to the opposite side of the lamp circuit to that grounded to the shutter casing, and if the end thereof dropped into engagement with the shutter casing the lamp circuit would be short circuited. To prevent any chance of this accidental short-circuiting from happening, the end of the actuating member 120 is provided with an insulating insert 158 into which the cable release is adapted to be screwed and the slidable pin 129 engaged by the cable of the cable release is made of an insulating material as shown.

The device in Fig. 5 is shown in its fully retracted position and is operated in the following manner to make a flash exposure. The cable of the cable release is moved by pressing on the head 159 thereof while pulling up on the flared grip 160 fixed to the cable sheathing, see Fig. 6 for showing of a head of a well-known type of cable release. This causes the movable pin 129 of the device to move toward the plunger assembly and compress the driving spring 123. After the pin 129 is moved a distance to compress the spring a given amount the end thereof engages the reduced end 128 of the plunger 113 and moves said plunger downwardly relative to the locked sleeve 112 until the reduced end of the plunger comes opposite the balls carried by the sleeve 112. Then the balls, being forced downwardly by the force of the compression spring 123 against the tapered end 127 on the insert 102, automatically move inwardly of the sleeve to engage the tapered shoulder 130 on the plunger and release the sleeve to permit it to slide. The instant the sleeve is released the driving spring 123 is free to expand and move the sleeve downwardly, and this downward movement of the sleeve is transmitted to the plunger through the balls carried thereby engaging the tapered shoulder 130 on the plunger, whereby the driving spring 123 moves the plunger assembly through its complete stroke independently of the cable release to trip the shutter and close the lamp circuit. As soon as the driving spring 123 is allowed to expand to its normal length by releasing the pressure on the cable release, the retracting spring 118 comes into play and returns the plunger assembly to its fully retracted position. The retracting spring 118 normally acts to move the plunger upwardly and this movement of the plunger is transmitted to the sleeve 112 through the balls 125 until the latter reaches its fully retracted position whereupon the tapered shoulder 130 of the plunger moves the balls laterally of the sleeve into locking engagement with the tapered end of the plunger insert, after which the plunger continues to move upwardly relative to the sleeve until the flange 117 on the end thereof engages the lower end of the sleeve.

The shutter release device constituting the present invention is not limited to use where the plunger extension rod 114 thereof directly engages the release member of the shutter mechanism. As shown in Fig. 6, this device can be readily adapted to be attached to the end of a cable release which in turn is directly threaded into the cable release of a shutter so that the plunger assembly trips the shutter release through the cable release rather than engaging said shutter release directly.

As shown in Fig. 6, the device is adapted for use with a two-wire flash synchronizing system and the parts are insulated from one another in the manner set forth in the modification shown in Fig. 5. The only difference in the modification shown in Fig. 6 from that shown in Fig. 5 is that the skirt member 106 includes a tubular extension 161 the lower end of which is adapted to engage the top of the grip 160 of the cable release and is externally threaded to receive an attaching collar 162 overhanging the under side of a grip to attach the device to the cable release. The tubular extension is sufficiently long to permit the cable of the cable release to assume its normally retracted position, and in which position the head 159 of the cable release abuts the end of the plunger extension rod 114, or a metal foot 163 attached thereto to provide a suitable bearing surface between the two parts. The inner wall of the tubular extension 161 is provided with an insulating sleeve 164 so that the foot 163 will not engage the tubular extension to short-circuit a lamp circuit connected to the jacks 156 and 157. In order to ground that side of the lamp circuit connected to the skirt member to the shutter casing the sheathing of the cable release should be metal, and to prevent a short circuit of the lamp circuit the cable of the cable release should be insulated from the sheathing of the cable, or any metal part of the cable release in metal to metal contact therewith, in any suitable manner not shown. When this form of device is attached to a camera shutter of the type indicated in Fig. 5 the cable on the cable release constitutes one switch contact and the bellcrank of the shutter the other switch contact so that the lamp circuit is adapted to be completed when these two parts move into engagement with one another during the shutter tripping operation.

From the above description of the invention it will be readily appreciated that I have provided a novel shutter release device which will repeatedly operate a shutter release with a given speed and pressure and independently of direct control by the operator. Thus a device is provided which prevents an operator from tripping the shutter in a manner to injure the shutter mechanism or cause undesirable camera movement. This device is readily adapted for synchronizing the flashing of the lamp with the tripping of the shutter and the above-mentioned operating characteristics of the device are highly desirable, or imperative, to such synchronization. The device is compact and neat in appearance, and the mechanism thereof is entirely enclosed to prevent the accumulation of dirt and tampering with the mechanism by a curious operator. The size and compactness of the device can probably be best appreciated when it is pointed out that the complete device in full size is approximately the size of the end of one's little finger. The fact that the parts are so arranged that certain of them serve two or more different purposes lends to the compactness and simplicity of the device. For instance, the part making up the plunger assembly not only serves to trip the shutter but also cooperates to form a releasable locking means for the plunger assembly. Also, certain parts constituting a locking means for the shutter assembly act as motion transmitting members between the plunger assembly parts when not serving in a locking capacity.

Although I have shown and described certain specific embodiments of my invention, I am fully aware that many modifications thereof are possible. Therefore, the present invention is not to be restricted except insofar as is necessitated by the scope of the appended claims.

Having thus described my invention, what I claim is new and desire to secure by Letters Patent of the United States is:

1. A shutter release device for use with a camera having a shutter and a release member therefor, and comprising a housing adapted to be detachably connected in operative association with said release member, a plunger assembly slidably mounted in said housing to move between an operative position, wherein it actuates said release member to trip the shutter, and a normal inoperative position, wherein it permits said release member to return to its cocked position, a spring for moving said plunger assembly to its operative position when under compression but normally expanded to permit the same to normally return to its inoperative position, means normally releasably locking said plunger assembly in its inoperative position, and including a latch member carried by a part of said plunger assembly and adapted to be moved into engagement with a fixed part on said housing by movement of the assembly to its normal position and positively held in engagement therewith by said assembly, means for placing said spring under compression and for releasing said latch member from engagement with said stationary part of said housing when said spring is compressed a given amount, whereupon said spring is free to expand and move said plunger assembly to its operative position independently of said spring compressing means.

2. A shutter release device for use with a camera having a shutter and a release member therefor, and comprising a housing adapted to be detachably connected in operative association with said release member, a plunger assembly slidably mounted in said housing to move between an operative position, wherein it actuates said release member to trip the shutter, and a normal inoperative position, wherein it permits said release member to return to its cocked position, a spring for moving said plunger assembly to its operative position when under compression but normally expanded to permit the same to normally return to its inoperative position, means normally releasably locking said plunger assembly in its inoperative position, and including a ball carried by a part of said plunger assembly and adapted to be moved laterally thereof into engagement with a fixed part on said housing, means for placing said spring under compression and for releasing said ball from engagement with the stationary part of said housing when said spring is compressed a given amount, whereupon said spring is free to expand and move said plunger assembly to its operative position independently of said spring compressing means.

3. A shutter release device for use with a camera having a shutter and a release member therefor, and comprising a housing adapted to be detachably connected in operative association with said release member, a plunger assembly slidably mounted in said housing to move between an operative position, wherein it actuates said release member to trip the shutter, and a normal inoperative position, wherein it permits said release member to return to its cocked position, a spring for moving said plunger assembly to its operative position when under compression but normally expanded to permit the same to normally return to its inoperative position, means normally releasably locking said plunger assembly in its inoperative position, and including a ball carried by a part of said plunger assembly and adapted to be moved laterally thereof into engagement with a fixed part of said housing tapered in the direction of movement of said plunger assembly when moving from its inoperative position, means for placing said spring under compression and for releasing said ball from engagement with the stationary part of said housing when said spring is compressed a given amount, whereupon said spring is free to expand and move said plunger assembly to its operative position independently of said spring compressing means.

4. A shutter release device for use with a camera having a shutter and a release member therefor, and comprising a housing adapted to be detachably connected to the camera in a position adjacent said release member, a plunger assembly slidably mounted in said housing to move between an operative position, wherein it actuates said release member, and an inoperative position, wherein it is retracted into said housing and frees said release member, said plunger assembly including a sleeve slidably mounted within said housing, a plunger slidably mounted in said sleeve and including a part adapted to extend from said housing to engage said shutter release, a releasable connection between said plunger and sleeve permitting a limited relative movement between the two prior, and subsequent, to being connected together, a spring normally acting to move said plunger to its inoperative position, a second spring engaging one end of said sleeve for moving said plunger assembly to its operative position when under compression but normally expanded to permit the same to normally return to its inoperative position under the action of said first mentioned spring, means normally releasably locking said plunger assembly in its inoperative position, and including a latch member carried by and movable laterally of said sleeve and adapted to be moved into engagement with a stationary part on said housing, means for placing said second spring under compression and for releasing said latch member from engagement with said stationary part of said housing when said spring is compressed a given amount, whereupon said spring is free to expand and move said plunger assembly to its operative position independently of said spring compressing means.

5. A shutter release device for use with a camera having a shutter and a release member therefor, and comprising a housing adapted to be detachably connected to the camera in a position adjacent said release member, a plunger assembly slidably mounted in said housing to move between an operative position, wherein it actuates said release member, and an inoperative position, wherein it is retracted into said housing and frees said release member, said plunger assembly including a sleeve slidably mounted within said housing, a plunger slidably mounted in said sleeve and including a part adapted to extend from said housing to engage said shutter release, a releasable connection between said plunger and sleeve, a spring normally acting to move said plunger to its inoperative position, a second spring engaging one end of said sleeve for moving said plunger assembly to its operative position when under compression but normally expanded to permit the same to normally return to its inoperative position under the action of said first mentioned spring, means normally releasably locking said plunger assembly in its inoperative position, and including a ball loosely seated in a hole extending through the wall of said sleeve, said ball having a diameter greater than the thickness of the wall of said sleeve and adapted to be forced laterally of the sleeve into engagement with a tapered part fixed on said housing by movement of said plunger in said sleeve, means for placing said second spring under compression and for moving said plunger relative to said sleeve when the spring is compressed a given amount to bring a recess in said plunger opposite said ball to permit the same to move from engagement with the tapered part on said housing, whereupon the plunger assembly is free to move to its operative position due to the expansion of said second spring.

6. A shutter release device for use with a camera having a shutter and a release member therefor, and comprising a housing adapted to be detachably connected to the camera in a position adjacent said release member, a plunger assembly slidably mounted in said housing to move to and from an extended position in which it is adapted to actuate said release member, said plunger assembly including a sleeve slidably mounted in said housing, a release member operating plunger slidably engaging said sleeve, resilient means normally acting to move said plunger assembly from said extended position, an actuating member slidably mounted in said housing in spaced relation to said plunger assembly, a compression spring between said actuating member and said sleeve normally expanded to permit said resilient means to move said plunger assembly from said extended position and adapted to be placed under compression by movement of said actuating member toward said assembly, means for releasably locking said plunger assembly against movement toward said extended position, and including a latch member carried by said sleeve and adapted to be moved into, and held in, engagement with a stationary part of said housing by said plunger, and means on said actuating member adapted to engage and move said plunger to a latch member releasing position after the same has been moved to place said spring under given compression whereupon said spring is free to expand and move said plunger assembly to its extended position independently of said actuating member.

7. A shutter release device for use with a camera having a shutter and a release device therefor which is electrically connected to one side of an electric current including a source of potential and a flash lamp, and comprising a housing adapted to be detachably connected to the camera in a position adjacent said release member, a plunger assembly slidably mounted in said housing to move to and from an extended position in which it is adapted to engage and actuate said release member, a spring for moving said assembly to its extended position when under compression but normally expanded to permit the same to normally move from its extended position, means normally releasably locking said plunger assembly in a retracted position, and including a latch member carried by a part of said plunger assembly and adapted to be moved into engagement with a fixed part on said housing by movement of the assembly to its normal position and positively held in engagement therewith by said assembly, means for placing said spring under compression and for releasing said latch member from engagement with said stationary part when said spring is compressed a given amount, whereupon said spring is free to expand and move said assembly to said extended position independently of said spring compressing means, and an electric terminal on said housing in electrical contact with said part of said assembly adapted to engage said shutter release and to which the other side of said electric circuit is adapted to be connected, whereby said flash lamp is adapted to be ignited in given time in relation to a release of said shutter.

8. A shutter release device for use with a camera having a between-the-lens type of shutter and a release therefor in combination with an electric circuit including a source of potential and a flash lamp, and comprising a housing adapted to be detachably connected to a camera casing over the cable release socket thereof with a part of said housing in electrical engagement with said shutter casing, a plunger assembly slidably mounted in said housing to move to and from an extended position in which a part thereof is adapted to extend through the cable release socket of said shutter casing to engage and actuate said release member, a spring for moving said assembly to its extended position when under compression but normally expanded to permit the assembly to normally move from its extended position, means normally releasably locking said plunger assembly in a retracted position, and including a latch member carried by a part of said assembly and adapted to be moved into engagement with a fixed part on said housing by movement of the assembly to its normal position and positively held in engagement therewith by said assembly, means for placing said spring under compression and for releasing said latch member from engagement with said stationary part when said spring is compressed a given amount, whereupon said spring is free to expand and move said assembly to said extended position independently of said spring compressing means, a pair of electric terminals on parts of said housing insulated from one another which are adapted to be connected to opposite sides of said electric circuit, one of said terminals electrically connected to said plunger assembly, the other electric terminal connected to the part of said housing contacting said shutter casing so as to be grounded through said casing to said shutter release member, whereby said flash lamp is adapted to be ignited in given timed relation to a release of said shutter.

9. A shutter release device for use with a camera having a shutter and a release member therefor, and comprising a housing adapted to be detachably connected to the camera in a position adjacent said release member, a plunger assembly slidably mounted in said housing to move between a shutter operating extended position and a retracted position, said plunger assembly including a sleeve movably mounted in said housing, a shutter release operating plunger slidably mounted in said sleeve, means normally moving said sleeve and plunger to said retracted position, a compression spring adapted to move said sleeve when under compression but normally expanded to permit the same to assume its retracted position, means for placing said spring under compression, a latch member movably carried by said sleeve and adapted to lock said sleeve in its retracted position until said spring is placed under sufficient compression to move the sleeve to its extended position whereupon it releases said sleeve, said latch member adapted to connect said sleeve and plunger together the instant it releases said sleeve, whereby said plunger is moved to an extended shutter operating position by the expansion of said spring.

10. A shutter release device for use with a camera having a shutter and a release member therefor, and comprising a housing adapted to be detachably connected to the camera in a position adjacent said release member, a plunger assembly slidably mounted in said housing to move between a shutter operating extended position and a retracted position, said plunger assembly including a sleeve movably mounted in said housing, a shutter release operating plunger slidably mounted in said sleeve, a retracting spring normally moving said plunger to its retracted position, a compression driving spring adapted to move said sleeve to its extended position when under compression but permitting the return of said sleeve to its retracted position when normally expanded, means for positively connecting said sleeve and plunger together during the time the sleeve is moved from its full retracted position but disconnecting the two when said sleeve is in its full retracted position, means for automatically locking said sleeve in its full retracted position when it reaches the same, means for compressing said driving spring and releasing said sleeve locking means when said spring is compressed a given amount, whereby said sleeve is moved from its extended position by said spring and moves said plunger to an extended position therewith.

11. A shutter release device for use with a camera having a shutter and a release member therefor, and comprising a housing adapted to be detachably connected to the camera in a position adjacent said release member, a plunger assembly slidably mounted in said housing to move between a shutter operating extended position and a retracted position, said plunger assembly including a sleeve movably mounted in said housing, a shutter release operating plunger slidably mounted in said sleeve, a retracting spring normally moving said plunger to its retracted position, a compression driving spring adapted to move said sleeve to its extended position when under compression but permitting the return of said sleeve to its retracted position when normally expanded, a single means carried by said sleeve and adapted to positively connect said sleeve and plunger together during the time said sleeve is removed from its full retracted and adapted to releasably lock said sleeve against movement and disconnect the sleeve and plunger when said sleeve is in its retracted position, and a manually operated actuating member movably mounted in said housing for placing said driving spring under compression and releasing said sleeve when the spring is compressed a given amount, whereupon said spring is free to expand and move said sleeve and along therewith the plunger to said extended position to trip the shutter.

JOSEPH MIHALYI.